Sept. 10, 1935.   B. P. JOHNSON   2,014,334
SEEDING MACHINE
Filed Dec. 19, 1932   4 Sheets-Sheet 1

Inventor
Ben P. Johnson
By Alexander Dowell
Attorney

Sept. 10, 1935.　　　B. P. JOHNSON　　　2,014,334
SEEDING MACHINE
Filed Dec. 19, 1932　　　4 Sheets-Sheet 2

Inventor
Ben P. Johnson
By Alexander Powell
Attorney

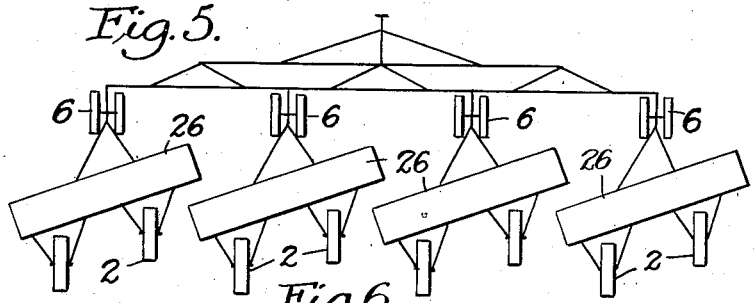
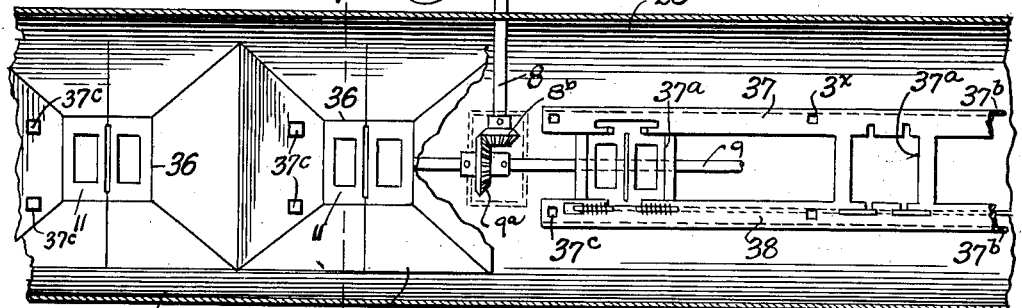
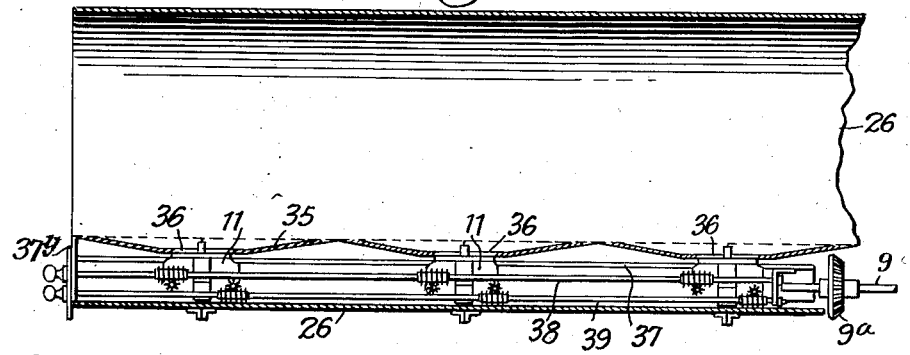
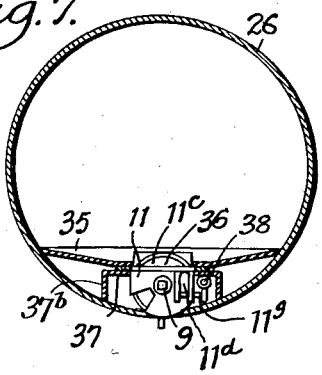
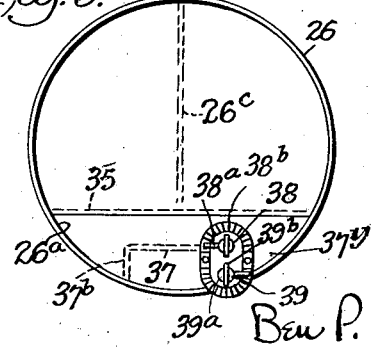

Sept. 10, 1935.　　　　B. P. JOHNSON　　　　2,014,334
SEEDING MACHINE
Filed Dec. 19, 1932　　　4 Sheets—Sheet 4

Inventor
Ben P. Johnson
By
Alexander Dell
Attorney

Patented Sept. 10, 1935

2,014,334

UNITED STATES PATENT OFFICE 2,014,334

SEEDING MACHINE

Ben P. Johnson, Springfield, Ohio, assignor to Edward E. Greiner, Springfield, Ohio Application December 19, 1932, Serial No. 648,007

21 Claims. (Cl. 221—130)

This invention is a novel improvement in "deep-furrow" seeding machines, the machine in the present application being an improvement upon that disclosed in my copending application Serial No. 591,407, filed February 6, 1932, now Patent No. 1,901,298 dated March 14, 1933.

The principal object of the invention is to provide a seeding machine of simple construction, the same having no supporting frame, a tubular seed hopper of sufficient strength being utilized to directly support the rear wheels, forecarriage, furrow openers, distributors, driving devices, and all parts of the machine secured by brackets to the hopper. Through the elimination of the supporting frame the amount of material and weight of machine is reduced materially, resulting in reduction of the cost of manufacture, also saving in freight charges; and by reducing the cubic dimensions of the machine a material saving in ocean freight is effected.

Other minor objects of the invention will be hereinafter set forth.

I will explain the invention with reference to the accompanying drawings which illustrate several practical embodiments thereof to enable others familiar with the art to adopt and use the same; and will summarize in the claims the novel features of construction, and novel combinations of parts, for which protection is desired.

In said drawings:—

Fig. 5 is a diagrammatic plan view of an assembly of four of the machines shown in Figs. 3 and 4, showing the angularity of the hoppers relative to the direction of pull.

Fig. 6 is an enlarged horizontal section through the tubular seed hopper for the grain drill showing the false bottom partly broken away.

Fig. 7 is a section on the line 7—7, Fig. 6.

Fig. 8 is an enlarged vertical longitudinal section through the seed hopper for the combined grain and fertilizer drill.

Fig. 9 is an end view of the hopper shown in Fig. 8.

Figure 1:
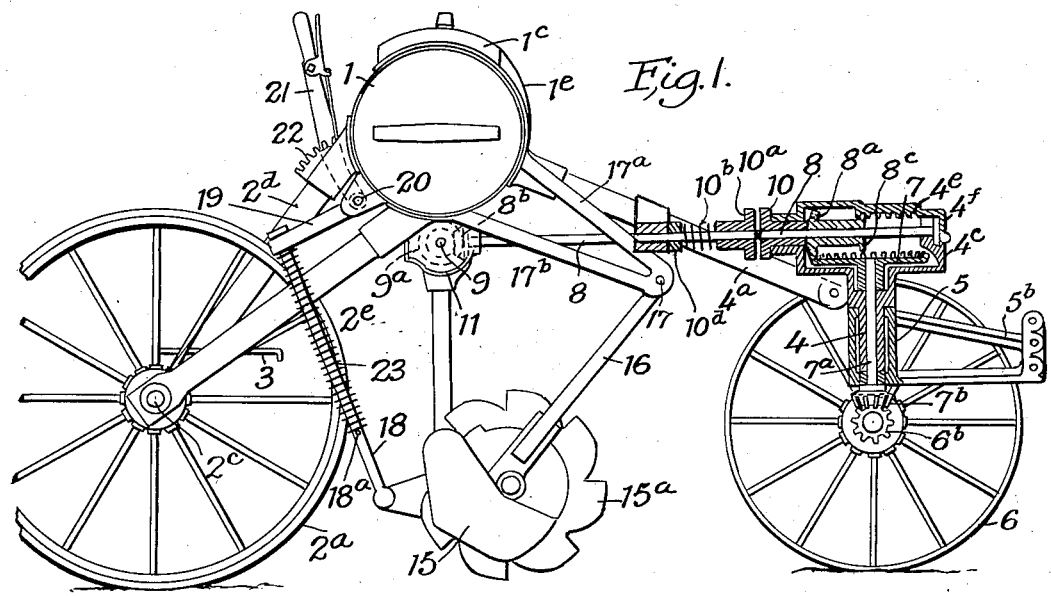
Fig. 1 is a side elevation of one form of seeding machine, showing the fore-carriage in longitudinal section.

The seeding machine shown in Figs. 1-2 comprises a tubular hopper 1, preferably a spiral welded steel tube, of such diameter and length as to possess sufficient rigidity to support the various parts of the machine bracketed thereto as hereinafter described. Hopper 1 is provided with two filling openings having arcuate covers 1c, 1d, adapted to slide in circumferentially disposed guides 1e to uncover the openings. By using two relatively short openings I retain the strength of the hopper.

The rear ground wheels preferably of the "closed" type mulch wheel disclosed in my copending application Serial No. 591,408 filed February 8, 1932, now Patent No. 1,901,299, dated March 14, 1933, consist of pairs of opposed wheels 2 having flat bearing surfaces 2b with circumferential offset shoulders 2a on their outer edges, the shoulders and bearing surfaces being perforated to permit dirt picked up by the outer edges of shoulders 2a to be deposited through the perforations as a loose mulch as the wheels rotate. The wheels being fully described in my aforesaid Patent No. 1,901,299, need no further detailed description herein.

The pairs of opposed wheels 2 are mounted on axles 2c journaled in pairs of struts 2d, 2e bracketed to hopper 1, the outside struts 2e being secured to the bottom of the hopper 1, and the inside struts 2d connected to the rear portion of the hopper, the struts extending rearwardly and downwardly from the hopper as shown in Fig. 1 permitting use of rear wheels of minimum diameter. In order to brace the pairs of struts 2d, 2e, a running board 3 (Fig. 2) is mounted between the pairs of struts and bracketed thereto by brackets 3a, 3b.

The fore-carriage is substantially identical with that disclosed in my Patent No. 1,901,298, above mentioned, and hence needs no particular description herein. Briefly it consists of a tubular casting 4 on the center line of the hopper and rigidly connected thereto by struts 4a, 4b (Fig. 2) extending from the front of the hopper. Swiveled upon the fore-carriage casting 4 is a steering casting 5, bifurcated at its lower end (Fig. 2), the bifurcations 5a carrying the front wheels 6 which are toed in at their bottoms, as in Fig. 2, so that their peripheries are closely adjacent at the ground level. A bracket 5b on steering casting 5 extends beyond and in front of the front wheels 6, and is adapted to be connected with a suitable tractor hitch, or a tongue casting for a horse hitch.

Casting 4 has an enlarged hollow head 4c on its upper end. In the head 4c is a change speed gear 7, mounted on a vertically disposed shaft 7a journaled in the casting 4. Shaft 7a carries a bevel gear 7b on its lower end meshing with a bevel gear 6b on the hub of one of the ground wheels 6 (Fig. 2) whereby the ground wheel will rotate the change speed gear 7.

Change speed gear 7 carries annular rows of teeth for effecting various ratios of speed for feed shaft 9, by engaging any row of teeth on the gear 7 a sliding pinion 8a which is held in mesh with any of the rows of teeth on gear 7 by engaging its flange 8c with the related notch 4e in the bottom of the hinged lid 4f of head 4c, whereby when the lid 4f is closed pinion 8a is locked axially of shaft 8.

Gear 7 rotates sliding pinion 8a (Fig. 1) splined on a shaft 8, one end of which is journaled in head 4c, the other end being journaled in a bearing (Fig. 1) mounted on the bottom of hopper 1; and a bevel gear 8b on shaft 8 drives bevel gear 9a on the distributor operating shaft 9 journaled below the hopper.

In order to uncouple the drive so as to avoid breakage of the parts in event foreign substances should become clogged in any of the distributors, or the direction of the machine is reversed, shaft 8 is made in two sections, and opposed ratchet faced clutch members 10 and 10a are mounted on the adjacent ends of the sections, one member 10a being slidably splined on its section and normally held in engagement with the other member 10 by a spring 10b around the shaft interposed between member 10a and a collar 10d fixed on its section, the spring being sufficiently strong to normally cause both shaft sections 8 to rotate as a unit while permitting the teeth of the ratchets to overrun. The end of the shaft section carrying the member 10a is supported in bearing 8x mounted between the struts 4a.

The distributors 11 are preferably identical with those disclosed in my copending applications Serial No. 591,409, filed February 6, 1932, now Patent No. 1,901,300, and Serial No. 591,727, filed February 8, 1932, now Patent No. 1,901,301, and hence need no particular description herein, the distrbutors 11 being secured to the bottom of the hopper 1 in the manner shown in my aforesaid Patent No. 1,901,298, and feeding grain, or grain and granular or pellet fertilizer, through tubes 12 to the rear of the coulter disks, the distributor operating shaft 9 rotating all the distributors in unison. The grain, and grain and fertilizer distributors, are hereinafter more fully described.

The spaced furrow openers (Figs. 1 and 2) preferably comprise a pair of mold boards 15 disposed at opposite sides of a rolling coulter disk 15a of the type shown in my copending application, Serial No. 428,892, filed February 17, 1930 (Patent No. 1,873,128) and therefore needs no particular description herein. Each furrow opener is preferably carried by an A-frame 16 pivotally mounted upon a draft rail 17 as shown in Figs. 1 and 2, whereby the furrow opener may be raised or lowered as hereinafter described. Draft rail 17 is supported by means of spaced pairs of braces 17a, 17b extending from the front portion of hopper 1.

Each frame 16 is provided with a pressure rod 18 (Fig. 1) pivotally connected to an arm 19 on a shaft 20 which is rotatably mounted in brackets 21 extending from the rear of hopper 1, shaft 20 having a lever 21 and ratchet mechanism 22 whereby the handle 21 may be set at any angularity desired. The pressure rods 18 preferably pass through bores in the outer ends of the arms 19, and have heads on their upper ends to prevent the arms 19 from becoming disengaged from the rods. Each arm 19 is adapted to slidably engage its rod 18 and a spring 23 is interposed between the arm 19 and a pin 18a on the pressure rod 18 whereby the tension of the spring 23 may be changed. By the above construction, when arms 19 are depressed, rods 18 will be yieldably depressed to hold the furrow openers 15 down to their work to open a furrow in front of the feed tubes 12. When however arms 19 are raised (as in full lines Fig. 1), arms 19 will engage the heads on the upper ends of rods 18 and raise the furrow openers 15 into inoperative position above the ground level. The rear wheels are placed directly in rear of the end furrow openers, and follow in the furrow on firm soil, and act as press wheels.

Figure 2:
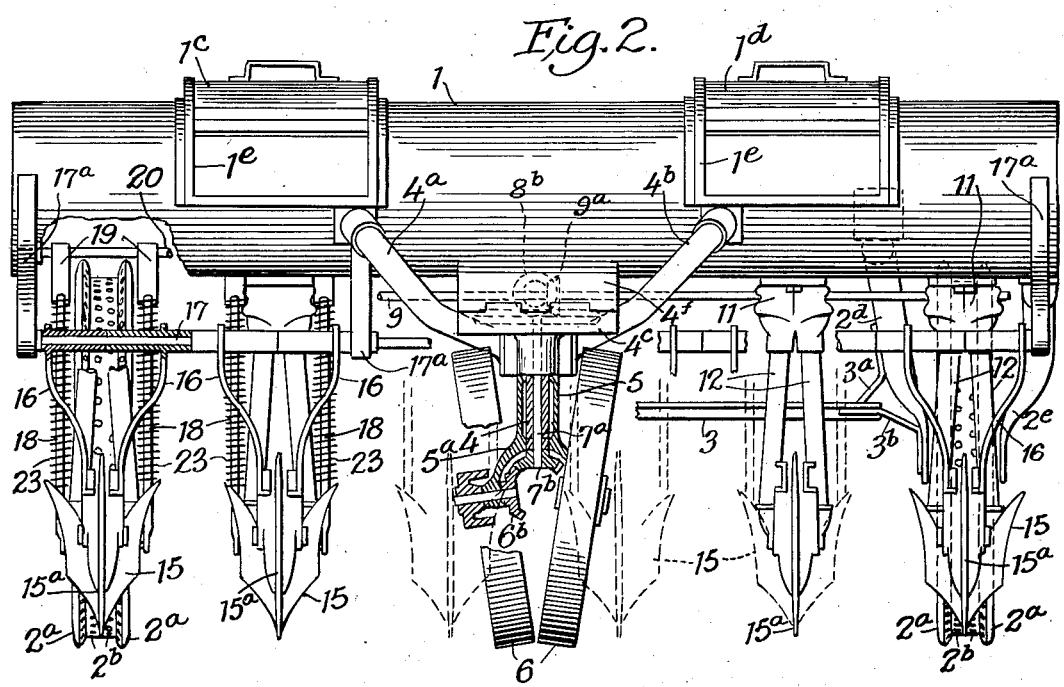
Fig. 2 is a front end elevation thereof, partly broken away.
Figure 3:
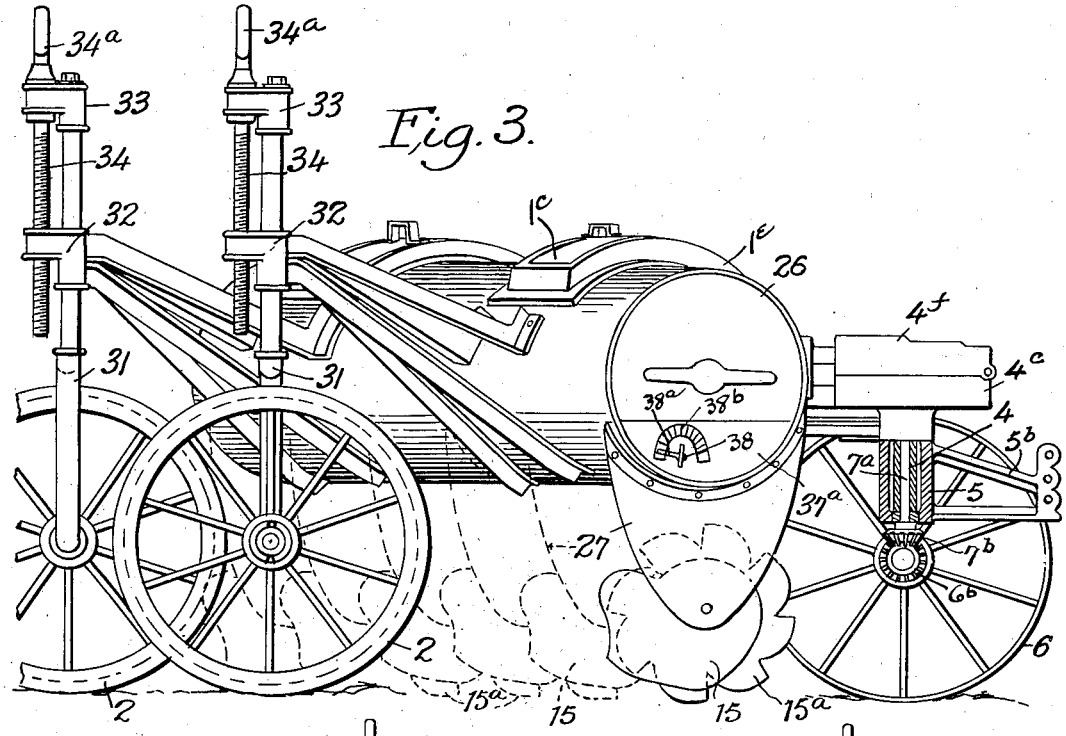
Fig. 3 is a side elevation similar to Fig. 1 of a modified form of seeding machine.
Figure 4:
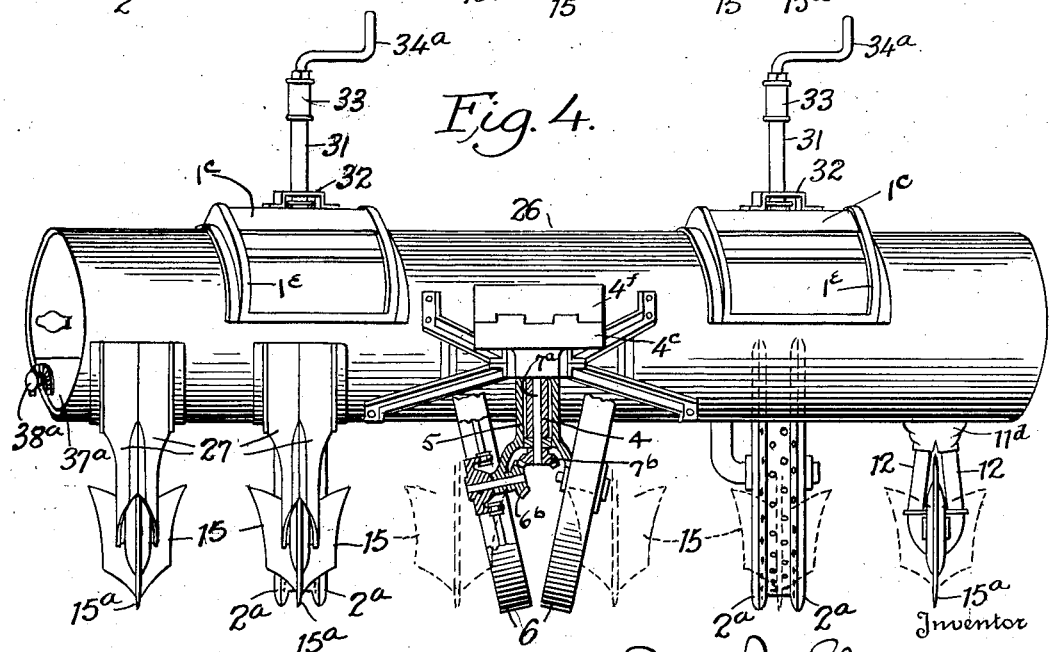
Fig. 4 is a front end elevation of the machine shown in Fig. 3, partly broken away.
Figure 10:
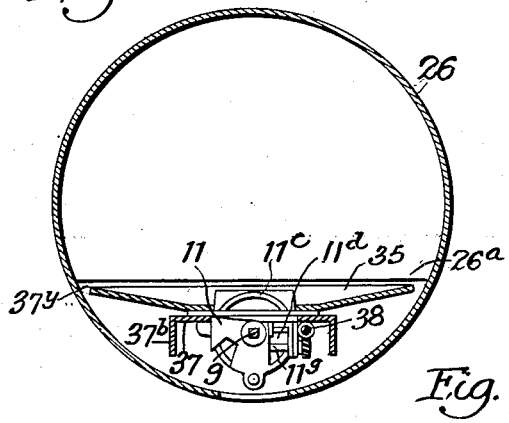
Fig. 10 is an enlarged transverse section, showing the frame carrying the grain distributors and false bottom of Fig. 7 raised to clear the distributors from the hopper openings to permit removal of the frame from the opening in the end of the hopper.

Figs. 1 and 2 illustrate a straight rank machine, but the hopper can, if desired, be disposed at an angle of from 20 to 25 degrees as illustrated in Figs. 3 and 4, resulting in an overlap of each furrow opener, less draft, prevention of clogging and pulverizing the soil. Such overlap is illustrated in Fig. 5 which shows four units, as per Figs. 3 and 4, arranged side by side and angularly disposed with respect to the direction of pull. The overlap of the furrow openers (Fig. 5) allows them to pass over or cut through trash and surface litter without clogging or shouldering. This prevents pulverizing the soil for if they were in a straight rank, the soil thrown by one furrow opener clashes with the soil thrown by the one next to it, breaking same into fine particles easily shifted by high winds. When overlapped, this action does not take place and the soil is left in a lumpy state, preventing shifting by high winds. When two or more seeding machines are hitched together as in Fig. 5 the construction simplifies a hitch for a gang drill hook-up. It also prevents the ends of the individual units from interfering when making turns.

The construction of the machine shown in Figs. 3 and 4 is similar to that shown in Figs. 1 and 2, the hopper 26 forming the supporting frame, and the rear wheels 2 and fore-carriage 4 being bracketed directly to the hopper 26, but the hopper is disposed at an angle of 20–25 degrees to the direction of pull, and the furrow openers and rear wheels and fore-carriage are likewise angularly disposed. Instead however of providing adjustments for raising and lowering the coulter hoes 15 as in Figs. 1 and 2 the counter disks 15 are bracketed directly to the hopper by bracket plates 27 which carry the journals for the coulter disk wheels 15a.

The rear wheels 2 (Figs. 3 and 4) are journaled in uprights 31 guided in bearings 32, 33, and uprights 31 may be raised up or down with respect to the bearings by adjustment of screw shafts 34 provided with cranks 34a to tilt the machine and thus bring the furrow openers 15 into or out of contact with the ground.

The hopper 26 of the machine shown in Figs. 3 and 4 also differs in construction from hopper 1 of Figs. 1 and 2, the hopper 26 being shown in detail in Figs. 6-13. A false bottom 35 (Fig. 6) extends the entire length of hopper 26 and is provided with the openings 36 (one for each distributor 11). False bottom 35 is removable with frame 37 (Fig. 6) and the bottom 35 and frame as a unit is adapted to be inserted through openings in the ends of the hopper 26. Frame 37 is secured to false bottom 35 by bolts 37c as shown in Fig. 6. Portions 26a at both ends of hopper 26 below the false bottom 35 are open, the ends 37y of frames 37 closing the openings 26a when the frames are inserted in place. The distributors 11 are removable in the frames 37 whereby the machine may be readily converted from a grain drill to a combined grain and fertilizer drill as hereinafter described, by substitution of distributors.

If the machine is to be used only as a grain drill the hopper shown in Figs. 6, 7, 10, 11 is used. The grain distributors 11 are placed in openings in the frames 37 with the flanges of the distributors resting upon the tops of the frame, and the false bottom 35 secured over the flanges and to the frame, and the frame inserted in the ends 26a of the hopper and the frames held elevated until the distributors are directly over the openings 26x in the bottom of the hopper into which the distributors drop. Each frame 37 (Fig. 6) consists of a plate, of substantially half the length of the hopper, having openings 37a therein into which the distributors are inserted from above, the openings 37a snugly receiving the distributors, and being spaced to correspond with the spacing of openings 36. The sides of plate 37 are flanged downwardly as at 37b (Fig. 7) to rest upon the bottom of hopper 26 and hold the distributors 11 properly spaced and to support the false bottom which is of width to engage the sides of the hopper when the flanges 37b are seated on the bottom of the hopper. Frames 37 carrying the distributors are inserted into each end of the hopper through the openings 26a, and hence the frames 37 may be withdrawn at any time for cleaning, repairing, or substitution of grain distributors for grain and fertilizer distributors. The distributor drive shaft 9 passes through the frames 37 and through the hubs of the distributor wheels as indicated in Figs. 6 and 7.

The distributors for grain only are preferably such as shown in my aforesaid Patent No. 1,901,300 and needs no particular description herein. Briefly each grain distributor 11 comprises a casting having a feed wheel 11c (Fig. 7) journaled therein through which wheel the drive shaft 9 extends. Wheel 11c is double acting and is provided with teeth on each side adjacent the periphery to simultaneously feed seeds on both sides of the wheel as the same rotates, the seeds dropping down into the throats 11d (Fig. 4) of distributing tubes 12. The distributors 11 have means to regulate the amount of seed distributed by opening and closing adjustable throats 11d (Fig. 7). As shown, each throat 11d is hinged to the side of the casting and is adapted to be swung towards or away from the web of wheel 11c adjacent its periphery to regulate the amount of seed delivered at the discharge point.

In order to adjust the throat 11c I provide shafts 11g (Fig. 9) carrying the throats, whereby as the shafts are rotated the throats will be pivoted. The shafts 11g of the several distributor throats are operated simultaneously by a shaft 38 journaled in frame 37 (Fig. 8) and geared to the shafts 11g (Fig. 7) whereby rotation of shaft 38 will simultaneously adjust all the throats 11d. Preferably each shaft 38 extends through the end plate 37y of frame 37 to the outside of the hopper, as is provided with a handle 38a (Fig. 9) for rotating the same.

Figure 12:
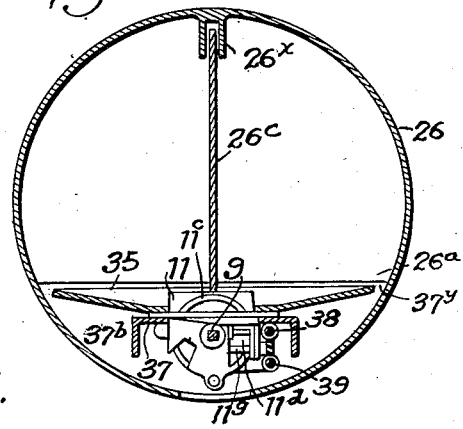
Fig. 12 is a section similar to Fig. 10 showing the combined grain and fertilizer distributors in the frame, the parts being elevated for removal from the hopper.
Figure 11:
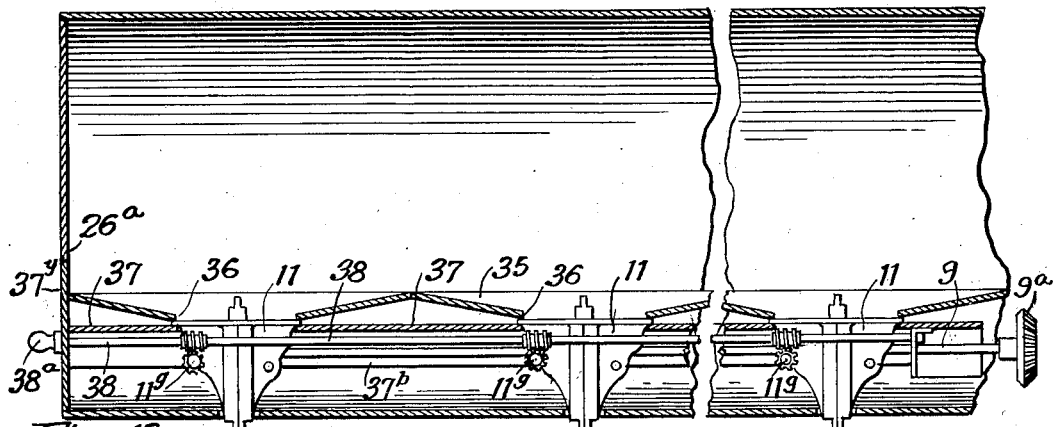
Fig. 11 is a longitudinal section through one end of the hopper showing the parts in Fig. 10 in normal position.
Figure 13:
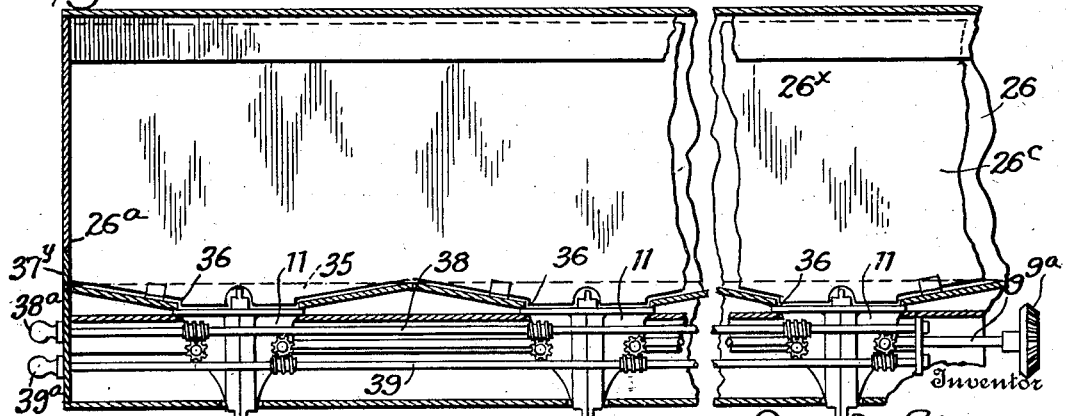
Fig. 13 is a longitudinal section similar to Fig. 11 modified to show the combined grain and fertilizer distributors and the partition.

If the machine is to be used for drilling both grain and fertilizer the frames 37 are removed from the hopper 26 and the combined grain and fertilizer distributors such as shown in my aforesaid Patent No. 1,901,301 are inserted. This type of distributor requires a longitudinally divided hopper for holding grain on one side, and fertilizer on the other side, of the hopper. The division plate 26c is indicated in Figs. 9, 12 and 13 and is removably attached to false bottom 35 by clips or the like, the upper end of the partition plate being received in a groove 26x cast on the top of the hopper. The distributors of this type have adjustable throats similar to throats 11d of Fig. 7, but each distributor has four such throats, two for grain and two for fertilizer. Hence in Fig. 8 two shafts 38, 39, are shown to respectively adjust the throats of the fertilizer and grain distributors, and similarly the shafts 38—39 extend through the end plates 37y of the frames 37 and are provided with handles 38a, 39a, and dials 38b—39b (Fig. 9) whereby all the throats of each frame 37 may be adjusted simultaneously.

I do not limit my invention to the exact forms shown in the drawings for obviously changes may be made therein within the scope of the claims.

I claim:—

1. In a seeding machine, a hopper, seed distributors, a removable false bottom within said hopper having openings therein registering with the seed distributors, frames removable with the false bottom and carrying the distributors and maintaining same in position against their openings.

2. In a machine as set forth in claim 1, said frames comprising plates having portions seating upon the bottom of the hopper; and means for removably securing the frames in position.

3. In a machine as set forth in claim 1, a drive shaft for operating the distributors extending through the frames.

4. In a machine as set forth in claim 1, said distributors having adjustable throats in their outlets; and means carried by the frames for adjusting the throats.

5. In a seeding machine, a hopper, seed distributors, a removable false bottom within said hopper having openings therein registering with the seed distributors, the ends of the hopper below the false bottom being open; frames removable with the false bottom and carrying the distributors, and maintaining the latter in position against their openings, the ends of the frames closing the open ends of the hopper.

6. In a machine as set forth in claim 5, said frames comprising plates having openings therein into which the distributors are placed, and having portions seating upon the bottom of the hopper; and means for removably securing the frames in position.

7. In a machine as set forth in claim 5, a drive shaft for operating the distributors extending through the frames.

8. In a machine as set forth in claim 5, said distributors having adjustable throats in their outlets; and means carried by the frames for adjusting the throats.

9. In a machine as set forth in claim 5, said distributors having adjustable throats in their outlets; means carried by the frames for simultaneously adjusting the throats; and means at the ends of the frames for operating the throat adjusting means.

10. In a seeding machine, a hopper, seed distributors, a removable false bottom within said hopper having openings therein registering with the seed distributors, frames removable with the false bottom and carrying the distributors and maintaining the latter in position against their openings; said distributors having adjustable throats in their outlets; shafts journaled in the frames; means on the shafts for operating the throats; and manual means on the shafts accessible on the exterior of the hopper for rotating the shafts.

11. In a machine as set forth in claim 10, said frames comprising plates having openings therein receiving the distributors, and having flanges seating upon the bottom of the hopper; and means for removably securing the frames in position.

12. In a seeding machine, a hopper, a removable false bottom within said hopper having openings therein, the ends of the hopper below the false bottom being open; frames in the hopper below and removable with the false bottom, the ends of the frames closing the open ends of the hopper; and seed distributors carried by the frames registering with the openings in the false bottom.

13. In a seeding machine, a hopper, a removable false bottom within said hopper having openings therein, the ends of the hopper below the false bottom being open; frames in the hopper below and removable with the false bottom, seed distributors carried by the frames and registering with the openings in the false bottom, said frames maintaining the distributors in place against their openings, and the ends of the frames closing the open ends of the hopper.

14. In a seeding machine, a hopper, a removable false bottom within said hopper having openings therein, the ends of the hopper below the false bottom being open; frames removable with and below the false bottom in the hopper; seed distributors carried by the frames registering with the openings in the false bottom, said distributors having adjustable throats in their outlets; means carried by the frames for adjusting the throats, and means at the ends of the frames for operating the throat adjusting means.

15. In a seeding machine, a hopper, a removable false bottom within said hopper having openings therein, the ends of the hopper below the false bottom being open; frames in the hopper below and removable with the false bottom, seed distributors carried by the frames, said frames maintaining the distributors in place against the openings, and the ends of the frames closing the open ends of the hopper; a drive shaft for the distributors extending through the frames; said distributors having adjustable throats in their outlets; means carried by the frames for simultaneously adjusting the throats, and means at the ends of the frames for operating the throat adjusting means.

16. In a seeding machine, seed distributors, a hopper having openings in its bottom for the seed distributors; a removable false bottom for the hopper having openings therein registering with the openings in the hopper; and means for securing the seed distributors to the false bottom whereby the distributors are removable with the false bottom.

17. In a seeding machine as set forth in claim 16, the hopper having an open end, and means carried by the false bottom for closing the open end when the false bottom is placed in the hopper.

18. In a seeding machine as set forth in claim 16, said means comprising a frame carrying the distributors and secured to the false bottom and removable therewith.

19. In a seeding machine as set forth in claim 16, said means comprising a frame carrying the distributors and secured to the false bottom and removable therewith, and a drive shaft for operating the distributors carried by the frame.

20. In a seeding machine as set forth in claim 16, said means comprising a frame carrying the distributors and secured to the false bottom and removable therewith, said distributors having adjustable throats in their outlets; and means carried by the frame for adjusting the throats.

21. In a seeding machine as set forth in claim 16, said means comprising a frame carrying the distributors and secured to the false bottom and removable therewith, and a drive shaft for operating the distributors carried by the frame, said distributors having adjustable throats in their outlets; and means carried by the frame for adjusting the throats.

BEN P. JOHNSON.